UNITED STATES PATENT OFFICE.

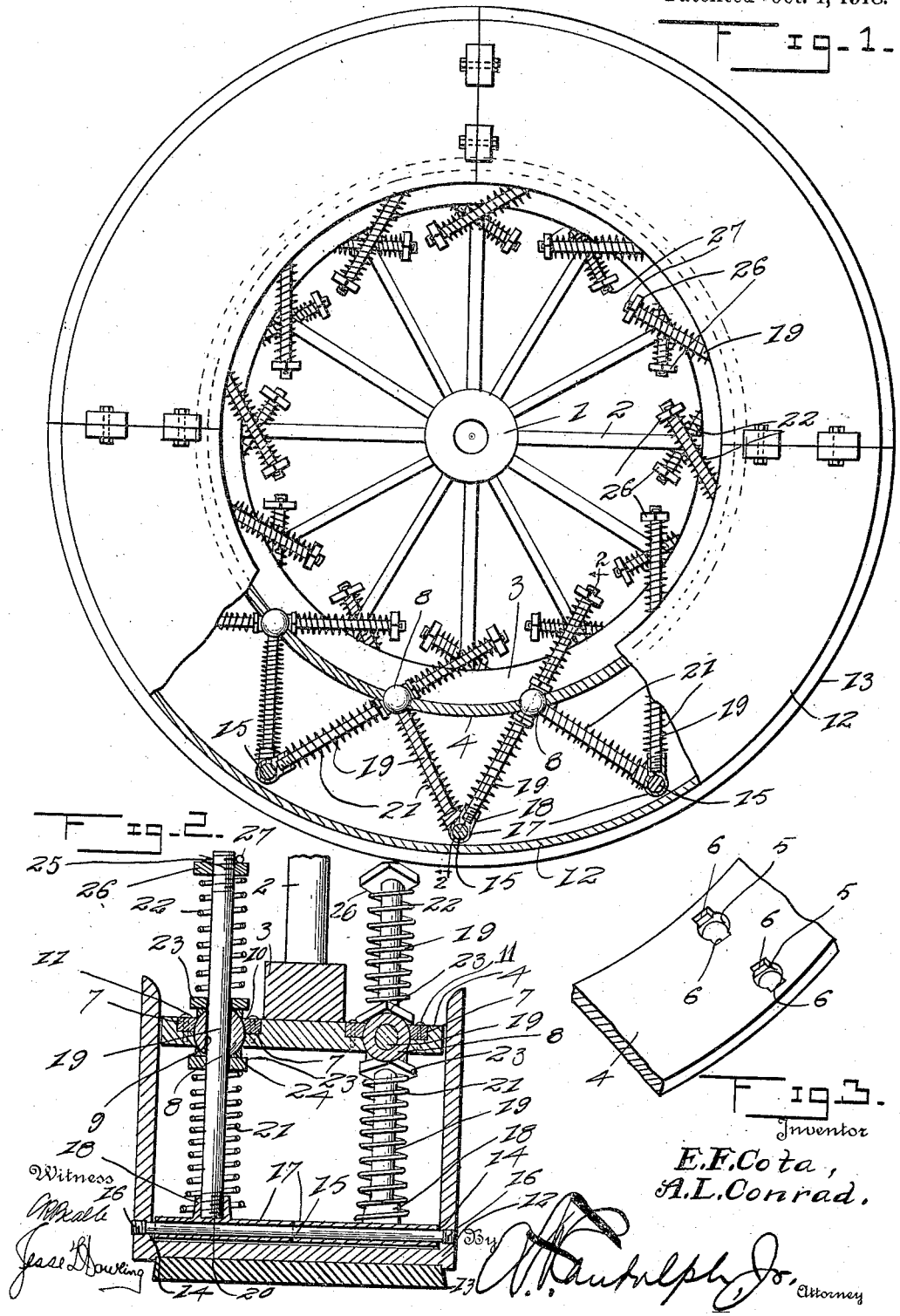

EMERSON F. COTA AND ARTHUR L. CONRAD, OF FRANKFORT, INDIANA, ASSIGNORS OF ONE-THIRD TO PETER WIDIN, OF NEW YORK, N. Y.

RESILIENT WHEEL.

1,280,583.  Specification of Letters Patent.  Patented Oct. 1, 1918.

Application filed August 12, 1916. Serial No. 114,586.

*To all whom it may concern:*

Be it known that we, EMERSON F. COTA and ARTHUR L. CONRAD, citizens of the United States, residing at Frankfort, in the county of Clinton and State of Indiana, have invented certain new and useful Improvements in Resilient Wheels; and we do hereby declare the following to be a full, clear, and exact description of the invention, such as will enable others skilled in the art to which it appertains to make and use the same.

This invention relates to improvements in resilient or spring wheels and has for an object to improve the construction of spring wheels so as to provide a resilient spring wheel which will supplant the pneumatic tire wheel now in use and at the same time give the same cushioning and resilient effect as does such pneumatic wheels.

A further object of this invention is the provision of a spring wheel which will give the same cushioning and resilient action as does a pneumatic wheel when the same encounters rough or uneven road beds.

A further object of this invention is to provide a resilient wheel of this character which will be a simple, practical and comparatively inexpensive structure, and one that can be manufactured and assembled at a comparatively small cost.

With these and other objects in view, the invention consists in the novel combination and arrangement of parts hereinafter more fully described and pointed out in the claims hereto appended.

In the drawings:

Figure 1 is a side elevation partly broken away showing our improved wheel as made in accordance with this invention, Fig. 2 is a sectional view taken on the line 2—2 of Fig. 1 looking in the direction indicated by the arrow, and Fig. 3 is a fragmentary perspective view of the inner rim illustrating the bearing openings.

Like numerals of reference designate corresponding parts in all the figures of the drawings.

Referring more particularly to the drawings, 1 designates the hub of the wheel, 2 the spokes thereof, and 3 the felly.

In applying our improved structure, we first secure a steel inner rim 4 to the felly which inner rim is arranged circumferentially around the felly and is provided with a plurality of bearing openings 5, which openings are arranged in spaced pairs and located between the spokes 2. One opening of each pair is located near the opposite longitudinal sides of the inner rim.

The openings 5 are provided on their inner face at diametrically opposite points with the recesses 6 in which are removably secured the bearing plates 7.

A spherical ball bearing 8 having a central bore 9 is secured in each of the openings 5 of the inner rim and a portion of the ball extends above and below the surfaces of the inner rim. The plates 7 are substantially rectangular in shape and have over-hanging lips 10, the under sides of which are curved to form bearing engaging surfaces and are held within the recesses of the rim by set screws 11 thereby preventing inward movement of the bearings when assembled.

An outer steel rim 12 including a plurality of sections substantially U-shaped in cross section is adapted to be positioned over the inner rim, the sections being adapted to be secured together. When the sections are secured together, they provide a continuous surface on which the removable tread 13 is secured. The flanges of the outer rim are provided at spaced intervals with alining openings 14, through which extend rods 15. The rods 15 are held against movement in either direction by screw plugs 16 which are fitted in the openings 14.

Rotatably mounted on each rod and located wholly within the outer rim are a pair of bearing sleeves 17. The bearing sleeves 17 of each pair are provided near each of their outer ends with the internally screw threaded bosses 18, which form sockets in which are secured one end of the pistons 19. It can be readily seen that due to the construction of the outer rim which is slidably mounted over the inner rim that any lateral movement or side movement of the outer rim with relation to the inner rim is obviated.

The pistons 19 are arranged in diagonal relation and extend through the bearings 8, and have their lower ends screw threaded as at 20, to be removably fitted in the bosses 18 carried by the bearing sleeves 17. The bearing sleeves 17 permit a rocking movement of the pistons thereby compensating for circumferential movement of the outer rim with relation to the inner rim when pressure is applied thereto during its sliding action toward the inner rim.

Carried by the pistons and located on opposite sides of the inner rim are the inner and outer coil springs 21 and 22. The outer coil springs 21 have their outer ends arranged around the bosses 18 and their inner ends abut the under sides of nuts 23 slidably mounted on the pistons 19.

The nuts 23 comprise the concave faces 24, to receive a portion of the spherical bearings 8 therein and prevent friction upon the springs when in use.

The inner ends of the pistons are screw threaded as at 25 to receive the nuts 26 thereon against which bear one end of the inner coil springs 22. A cotter pin 27 extends transversely through the ends of the pistons to prevent the movement of the nuts 26 therefrom.

In assembling the device, the pistons are mounted through the bearings 8 and the springs bear against the nut slidably mounted thereon. It can be readily seen that the strain and pressure are evenly distributed and taken up by the springs during the movement of the outer rim toward the inner rim when a load is taken upon the wheel.

It can be also seen that by locating the inner rim within the outer rim the sidewise motion of the same is eliminated.

It can be readily seen that in a tire constructed in this manner, time and labor will be reduced to a minimum and any one of the parts can be replaced at will.

What is claimed is:

1. A spring wheel including a hub, spokes radiating from the hub, an inner rim secured to the outer ends of the spokes, an outer rim, rods removably secured to the flanges of the outer rim, pairs of sleeves, each pair being rotatably mounted on each rod carried by the outer rim, spherical bearings mounted in the inner rim, pistons slidably mounted through said bearings and having their outer ends connected to the sleeves, and springs surrounding said pistons on the opposite sides of the inner rim, and means for engaging the inner ends of the pistons to retain the springs thereon.

2. A spring wheel including a hub having spokes radiating therefrom, an inner rim secured to the spokes, an outer rim slidably inclosing said inner rim, a plurality of rods arranged transversely through the outer rim and at a spaced distance apart, pairs of bearing sleeves, each pair being rotatably mounted on each rod of the outer rim, sockets carried by the sleeves, spherical bearings removably mounted in the inner rim, pairs of pistons, said pistons being slidably mounted through said bearings of the inner rim, the outer ends of the pistons being removably secured in the sockets carried by the sleeves, springs surrounding the pistons on opposite sides of the inner rim, and means on the inner ends of the pistons engaging the springs for retaining the latter thereto.

In testimony whereof we affix our signatures in presence of two witnesses.

EMERSON F. COTA.
ARTHUR L. CONRAD.

Witnesses:
JULIUS PRINZ,
HELEN PRUN.

Copies of this patent may be obtained for five cents each, by addressing the "Commissioner of Patents, Washington, D. C."